United States Patent
Ishi

(10) Patent No.: US 10,668,540 B2
(45) Date of Patent: Jun. 2, 2020

(54) INSERT, DRILL, AND METHOD OF MANUFACTURING MACHINED PRODUCT USING THE SAME

(71) Applicant: Kyocera Corporation, Kyoto-shi, Kyoto (JP)

(72) Inventor: Hirohisa Ishi, Omihachiman (JP)

(73) Assignee: KYOCERA CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 15/560,517

(22) PCT Filed: Feb. 26, 2016

(86) PCT No.: PCT/JP2016/055780
§ 371 (c)(1),
(2) Date: Sep. 22, 2017

(87) PCT Pub. No.: WO2016/152376
PCT Pub. Date: Sep. 29, 2016

(65) Prior Publication Data
US 2018/0111205 A1   Apr. 26, 2018

(30) Foreign Application Priority Data

Mar. 23, 2015 (JP) ................... 2015-059648
Jul. 24, 2015 (JP) ................... 2015-146761

(51) Int. Cl.
*B23B 27/16* (2006.01)
*B23C 5/20* (2006.01)

(52) U.S. Cl.
CPC ... *B23B 27/1611* (2013.01); *B23B 2200/0476* (2013.01); *B23B 2200/202* (2013.01);
(Continued)

(58) Field of Classification Search
CPC .......... B23C 5/207; B23C 5/202; B23C 5/20; B23B 220/202; B23B 220/205; B23B 2251/50; B23B 51/048
See application file for complete search history.

(56) References Cited

U.S. PATENT DOCUMENTS 9,623,495 B2 *   4/2017   Hoffer .................. B23C 5/207
2003/0031520 A1 * 2/2003 Hintze ................... B23B 27/141
407/114
(Continued)

FOREIGN PATENT DOCUMENTS

JP    S6456903 U   4/1989
JP    2011121131 A   6/2011
(Continued)

OTHER PUBLICATIONS

Description JP2011121131 obtained at https://worldwide.espacenet.com/ (last visited on Aug. 28, 2018).*
(Continued)

*Primary Examiner* — Ryan C Rufo
(74) *Attorney, Agent, or Firm* — Viering, Jentschura & Partner MBB

(57) ABSTRACT

In an embodiment, an insert includes an upper surface including a corner part, a lower surface, a side surface, and a cutting edge. The side surface is between the upper surface and the lower surface. The cutting edge is at least at a part of a first region in which the upper surface intersects with the side surface. The cutting edge includes a first cutting edge at the corner part, a second cutting edge, a third cutting edge, and a fourth cutting edge. The second cutting edge is next to the first cutting edge, and also next to the third cutting edge. The third and fourth cutting edges: each have a convex curvilinear shape with first and second radii of curvature, respectively; and extend downward and upward, respec-
(Continued)

tively, in a side view as going farther from the second cutting edge. The second radius smaller than the first radius.

17 Claims, 18 Drawing Sheets

(52) U.S. Cl.
CPC ... *B23B 2251/082* (2013.01); *B23B 2251/127* (2013.01); *B23B 2251/50* (2013.01); *B23C 5/207* (2013.01)

(56) References Cited

U.S. PATENT DOCUMENTS

| | | | | |
|---|---|---|---|---|
| 2003/0180103 | A1* | 9/2003 | Nagaya | B23C 5/207 407/34 |
| 2007/0071560 | A1* | 3/2007 | Karonen | B23B 27/16 407/34 |
| 2008/0304924 | A1* | 12/2008 | Engstrom | B23C 5/202 407/114 |
| 2010/0150671 | A1* | 6/2010 | Oprasic | B23C 5/207 407/42 |
| 2011/0044776 | A1 | 2/2011 | Ishi | |
| 2012/0063858 | A1 | 3/2012 | Onozawa et al. | |
| 2012/0070240 | A1* | 3/2012 | Ishi | B23C 5/06 407/42 |
| 2012/0155976 | A1* | 6/2012 | Ishi | B23C 5/06 407/33 |
| 2012/0189396 | A1* | 7/2012 | Xu | B23C 5/06 409/132 |
| 2012/0275868 | A1* | 11/2012 | Saito | B23C 5/06 407/42 |
| 2013/0045061 | A1* | 2/2013 | Ishi | B23C 5/109 409/132 |
| 2013/0094913 | A1* | 4/2013 | Yoshida | B23C 5/06 407/42 |
| 2014/0126970 | A1* | 5/2014 | Maeta | B23C 5/06 407/114 |
| 2014/0199127 | A1* | 7/2014 | Imai | B23C 5/202 407/42 |
| 2014/0212229 | A1* | 7/2014 | Diepold | B23C 5/202 407/42 |
| 2016/0144438 | A1* | 5/2016 | Yamamichi | B23C 5/06 409/131 |

FOREIGN PATENT DOCUMENTS

| | | | | | |
|---|---|---|---|---|---|
| JP | | 2012-051075 A | * | 3/2012 | ............ B23B 51/00 |
| JP | | 2013-022729 A | * | 2/2013 | ............ B23B 51/00 |
| WO | | 2009142323 A1 | | 11/2009 | |
| WO | | 2010137701 A | | 12/2010 | |
| WO | WO 2014208513 A1 | | * | 12/2014 | ............... B23C 5/06 |

OTHER PUBLICATIONS

Description JP2011121131 (translation) obtained at https://worldwide.espacenet.com/ (last visited Jan. 25, 2018).*
International Search Report based on Application No. PCT/JP2016/055780 (2 Pages) dated Apr. 12, 2016 (Reference Purpose Only).

* cited by examiner

US 10,668,540 B2

INSERT, DRILL, AND METHOD OF MANUFACTURING MACHINED PRODUCT USING THE SAME

RELATED APPLICATIONS

The present application is a national stage entry according to 35 U.S.C. § 371 of PCT application No. PCT/JP2016/055780 filed on Feb. 26, 2016, which claims priority from Japanese application No.: 2015-059648 filed on Mar. 23, 2015, and Japanese application No.: 2015-146761 filed on Jul. 24, 2015, and are incorporated herein by reference in its entirety.

TECHNICAL FIELD

The present embodiment relates to an insert for use in a drilling process, a drill, and a method of manufacturing a machined product.

BACKGROUND ART

As an example of drills for use in the drilling process, an indexable insert drill described in PCT International Publication No. WO 2010-137701 (Patent Document 1) has been known. The drill described in Patent Document 1 is made up of a body part having a chip discharge flute, and an insert having a cutting edge for use in cutting, which is detachably attached to the body part. The drill described in Patent Document 1 includes two inserts of the insert having a center cutting edge and the insert having an outer peripheral cutting edge.

SUMMARY

In an embodiment, an insert includes an upper surface, a lower surface, a side surface, and a cutting edge. The upper surface includes a first corner part and a second corner part. The side surface is located between the upper surface and the lower surface. The cutting edge is located at least at a part of a first region in which the upper surface intersects with the side surface. The cutting edge includes a first cutting edge located at the first corner part, a second cutting edge next to the first cutting edge, a third cutting edge next to the second cutting edge, and a fourth cutting edge next to the third cutting edge. The third cutting edge has a convex curvilinear shape, with a first radius of curvature, and extends downward as going farther from the second cutting edge in a side view. The fourth cutting edge has a convex curvilinear shape, with a second radius of curvature, and extends upward as going farther from the third cutting edge in a side view. The second radius of curvature is smaller than the first radius of curvature.

EMBODIMENTS

Figure 1:
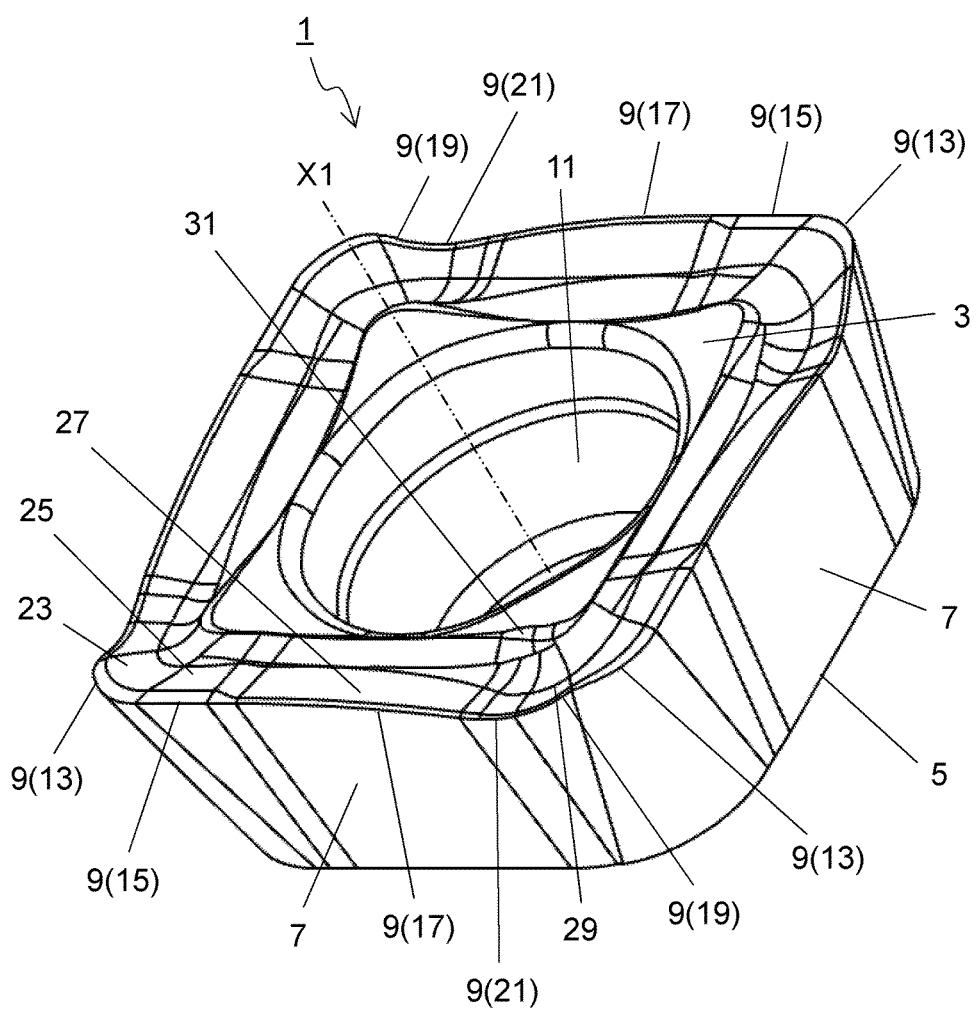
FIG. 1 is a perspective view of an insert according to an embodiment.

For a drill including a center cutting edge (inner cutting edge) and an outer peripheral cutting edge (outer cutting edge), the outer peripheral cutting edge is used for cutting at a relatively high cutting speed, and therefore a chip is apt to be divided. In contrast, an inner peripheral cutting edge is used for cutting at a relatively low cutting speed, and therefore a chip spirally extending long is apt to occur. Because the chip extending long becomes heavy, damage may occur to a processing apparatus configured to allow attachment of a drill when this chip is discharged outside.

An insert which is used for an indexable insert drill is described in detail below with reference to the drawings in various embodiments. For convenience of description, the drawings referred to in the following show, in simplified form, only main components necessary for describing the embodiments. Therefore, the insert may include any optional component not shown in the drawings referred to in the present description. Sizes of the components in the drawings are not faithful to sizes of actual components and to size ratios of these individual components.

<Insert>

The insert 1 of the present embodiment is suitably usable for the purpose of the inner cutting edge in the indexable insert drill. The insert 1 includes, for example, an upper surface 3, a lower surface 5, a side surface 7, a cutting edge 9, and a through hole 11 as shown in FIG. 1. For example, cemented carbide or cermet is usable as a material of the insert 1.

Examples of compositions of the cemented carbide include WC—Co, WC—TiC—Co, and WC—TiC—TaC—Co. Here, WC, TiC, and TaC are hard particles, and Co is a binding phase.

The cermet is a sintered composite material obtainable by compositing metal with a ceramic ingredient. Specific examples of the cermet include titanium compounds including, such as titanium carbide (TiC) or titanium nitride (TiN) as a main ingredient.

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

Figure 2:
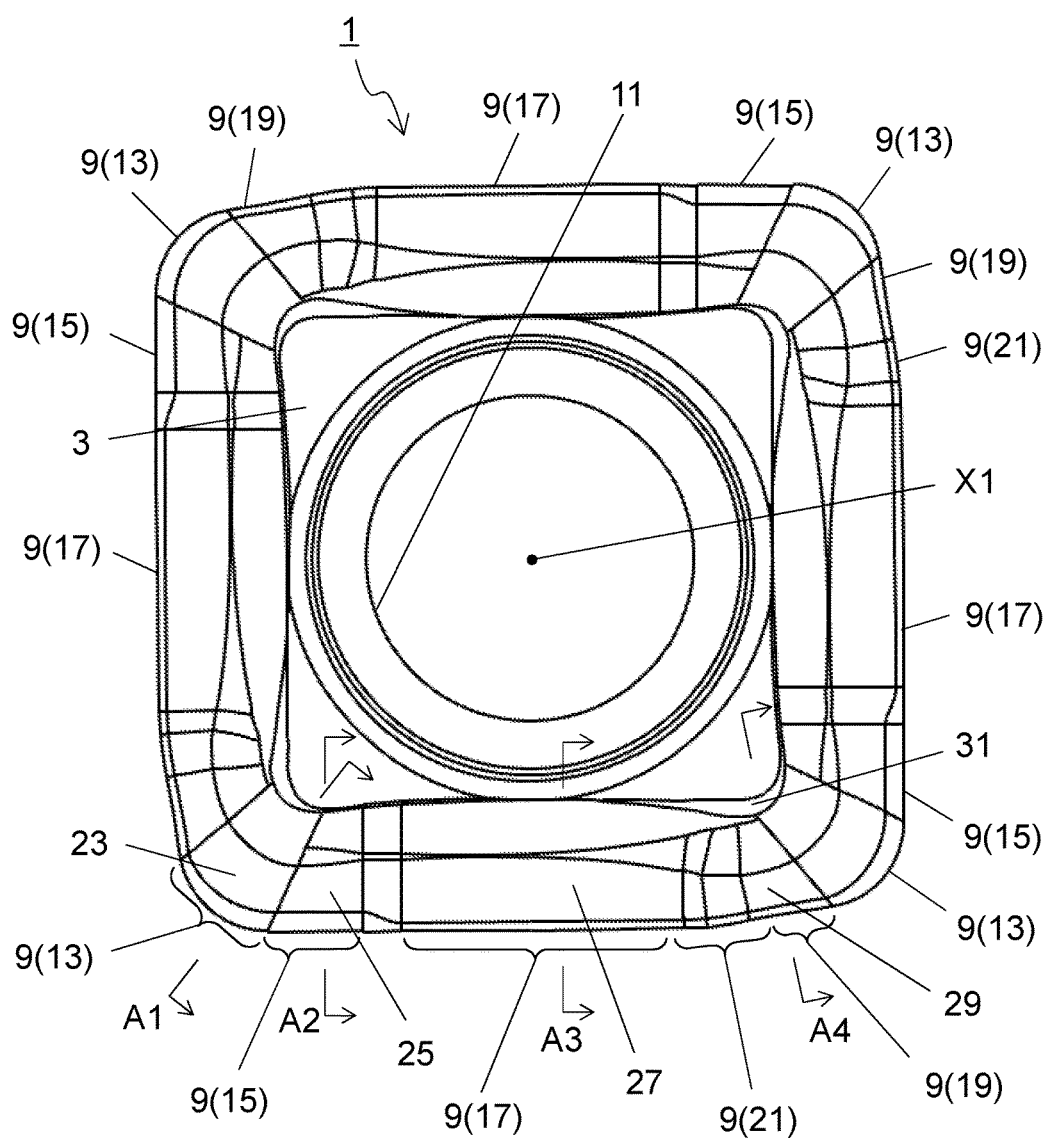
FIG. 2 is a top view of the insert illustrated in FIG. 1.

As shown in FIG. 2, the upper surface 3 has a polygonal shape including corner parts and side parts. As used herein, the term "polygonal shape" does not mean a precise polygonal shape. For example, each of the four corner parts of the upper surface 3 in the present embodiment is not made into a precise corner, but has a rounded shape in a top view. Each of the four side parts is not a precise straight line shape.

The upper surface 3 in the present embodiment has an approximately quadrangular shape. Accordingly, the upper surface 3 has four corner parts and four side parts. The four corner parts and the four side parts are placed so as to have 90-degree rotational symmetry around a central axis X1 in a top view.

Figure 3:
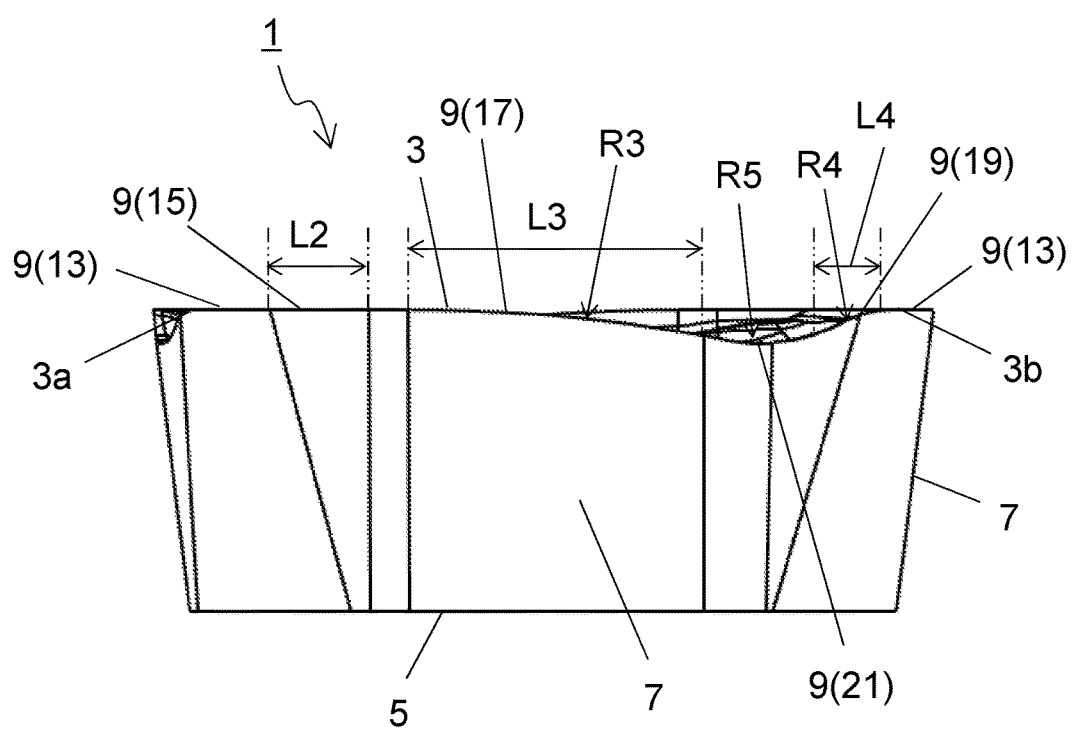
FIG. 3 is a side view of the insert illustrated in FIG. 1.

As shown in FIG. 3, the lower surface 5 is a surface located opposite to the upper surface 3, and serves as a seating surface onto a pocket when the insert 1 is attached to a holder. Similarly to the upper surface 3, the lower surface 5 in the present embodiment has a polygonal shape, which is slightly smaller than the upper surface 3. Therefore, an outer peripheral edge of the lower surface 5 is not visible due to the upper surface 3 in the top view shown in FIG. 2.

The shapes of the upper surface 3 and the lower surface 5 are not limited to the above embodiment. Although the upper surface 3 and the lower surface 5 have the approximately quadrangular shape in the insert 1 of the present embodiment, for example, the shapes of the upper surface 3 and the lower surface 5 may be a triangular shape, a pentagonal shape, a hexagonal shape, or an octagonal shape Although the upper surface 3 in the present embodiment has an approximately square shape, the quadrangular shape is not limited to this shape, but may be a rhombus shape or rectangular shape.

As shown in FIG. 3, the side surface 7 is located between the upper surface 3 and the lower surface 5, and is connected to the upper surface 3 and the lower surface 5. When the lower surface 5 has the shape being slightly smaller than that of the upper surface 3 as described above, the side surface 7 has a trapezoidal shape in a side view. In other words, a longitudinal side of the side surface 7 in the side view as shown in FIG. 3 is inclined so as to approach the central axis X1 (not shown in FIG. 3) as going from the upper surface 3 toward the lower surface 5.

When the upper surface 3 in the insert 1 of the present embodiment is viewed from above, a maximum width thereof is 6-25 mm. A height from the lower surface 5 to the upper surface 3 is 1-10 mm. As used herein, the term "height from the lower surface 5 to the upper surface 3" denotes a length in a direction parallel to the central axis X1 in between an upper end of the upper surface 3 and a lower end of the lower surface 5.

The configurations of the upper surface 3, the lower surface 5, and the side surface 7 are not limited to the above embodiment. For example, the lower surface 5 may have the same shape as the upper surface 3, and the outer periphery of the lower surface 5 may be overlapped with the outer periphery of the upper surface 3 in a planar perspective. In this case, the side surface 7 is disposed so as to be orthogonal to the upper surface 3 and the lower surface 5.

The insert 1 of the present embodiment includes the through hole 11 extending from the center of the upper surface 3 toward the center of the lower surface 5 as shown in FIG. 1. The through hole 11 is configured to receive a screw inserted when the insert 1 is screwed into the holder of the drill. The lower surface 5 in the present embodiment is a flat surface, and an extending direction, in other words, a penetrating direction of the through hole 11 is orthogonal to the lower surface 5.

The cutting edge 9 is located at least at a part of a region in which the upper surface 3 and the side surface 7 intersect each other. The cutting edge 9 is used for cutting a workpiece during a cutting process. As shown in FIG. 1, the cutting edge 9 in the present embodiment includes a first cutting edge 13, a second cutting edge 15, a third cutting edge 17, and a fourth cutting edge 19. The first cutting edge 13 is located at the corner part of the upper surface 3. The second cutting edge 15, the third cutting edge 17, and the fourth cutting edge 19 are respectively located at the side parts of the upper surface 3. That is, the second cutting edge 15, the third cutting edge 17, and the fourth cutting edge 19 are sequentially located on the side parts of the upper surface 3 in a direction away from the first cutting edge 13.

The upper surface 3 in the present embodiment includes the four corner parts and the four side parts. Therefore, when the first cutting edge 13, the second cutting edge 15, the third cutting edge 17, and the fourth cutting edge 19 constitute one set, the upper surface 3 has four sets. For the sake of convenience, one of the corner parts is hereinafter referred to as "a first corner part 3a." The following description focuses on one of the side parts next to the first corner part 3a.

The first cutting edge 13 is disposed at a position corresponding to the first corner part 3a of the upper surface 3. As described earlier, the corner part in the upper surface 3 has the rounded shape in the top view. Therefore, the first cutting edge 13 has a rounded shape in the top view. Specifically, the first cutting edge 13 has a circular arc shape protruding outward in the top view.

The second cutting edge 15 is next to the first cutting edge 13. The second cutting edge 15 in FIG. 3 has a straight line form parallel to the lower surface 5. During the cutting process of the workpiece, the second cutting edge 15 is a portion located closer to a front end of the drill than first cutting edge 13, and configured to bite into the workpiece. When the second cutting edge 15 has the straight line form parallel to the lower surface 5, it is ensured that the second cutting edge 15 more stably bites into the workpiece.

The third cutting edge 17 is next to the second cutting edge 15. The fourth cutting edge 19 is next to the third cutting edge 17. Here, the third cutting edge 17 need not necessarily be directly connected to the second cutting edge 15. Similarly, the fourth cutting edge 19 need not necessarily be directly connected to the third cutting edge 17. One end of the fourth cutting edge 19 is next to the third cutting edge 17, and the other end thereof is next to another corner part (hereinafter referred to as "a second corner part 3b" for the sake of convenience).

The third cutting edge 17 is inclined downward as going farther from the second cutting edge 15 in a side view. The fourth cutting edge 19 is inclined upward as going farther from the third cutting edge 17 in a side view. Each of the third cutting 17 and the fourth cutting edge 19 has a convex curvilinear shape. The third cutting edge 17 and the fourth cutting edge 19 do not have the same radius of curvature.

Specifically, a radius of curvature R4 of the fourth cutting edge 19 is smaller than a radius of curvature R3 of the third cutting edge 17.

In cases where a region of the cutting edge 9 located from the third cutting edge 17 to the fourth cutting edge 19 has a concave curvilinear shape being recessed downward when viewed as a whole, it is possible to curve a chip generated within the region, thereby making the chip into a stable spiral shape.

A corresponding position of the cutting edge 9 is described below with reference to the spiral-shaped chip generated when a cutting process of a workpiece is carried out using the insert 1 of the present embodiment. The first cutting edge 13, the second cutting edge 15, and a region of the third cutting edge 17 which is located close to the second cutting edge 15 correspond to a portion C1 of the chip shown in FIG. 4(b). As shown in FIG. 4(b), the portion C1 of the chip has a small curvature in a cross-sectional view of the chip, and therefore becomes a relatively highly deformable flat shape.

A region extending from a portion of the third cutting edge 17, which is located close to the fourth cutting edge 19, to the fourth cutting edge 19 corresponds to a portion C2 of the chip shown in FIG. 4(b). Because the third cutting edge 17 and the fourth cutting edge 19 have the convex curvilinear shape, the portion C2 of the chip has a largely curved convex shape that is hardly deformable as shown in FIG. 4(b).

Figure 4A:
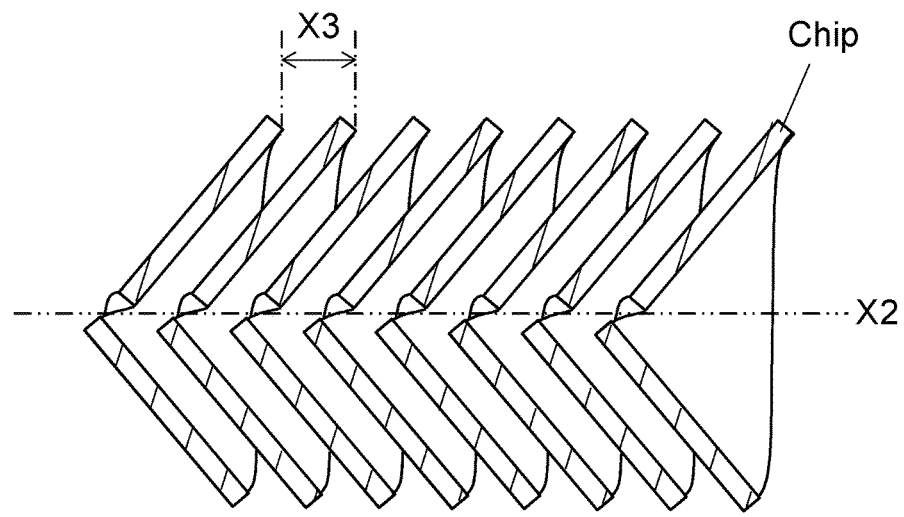
FIG. 4A is a schematic diagram of a chip obtained through a cutting process using a known insert.
Figure 4B:
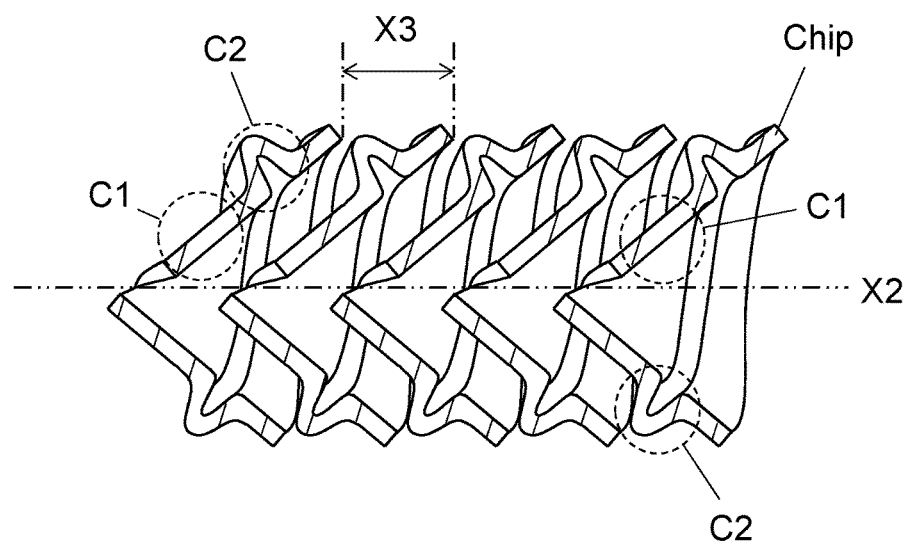
FIG. 4B is a schematic diagram of a chip obtained through a cutting process using an insert of the present embodiment.

In contrast, a spiral-shaped chip generated when a cutting process of a workpiece is carried out using a conventional insert is a series of flat shapes with less curvature extending from an inner peripheral side of an axis X2 of the chip to an outer peripheral side thereof as shown in FIG. 4(a).

In the insert 1 of the present embodiment, a convex shaped portion C2 of the chip located on an outer peripheral side obstructs extension of the chip into a spiral shape, and hence the pitch of the chip is less apt to become short, whereas the portion C1 of the chip located on an inner peripheral side deforms along a portion of the chip located on an outer peripheral side. Consequently, the pitch of the chip becomes long. The term "the pitch of the chip" denotes X3 in FIGS. 4(a) and 4(b).

Figure 5:
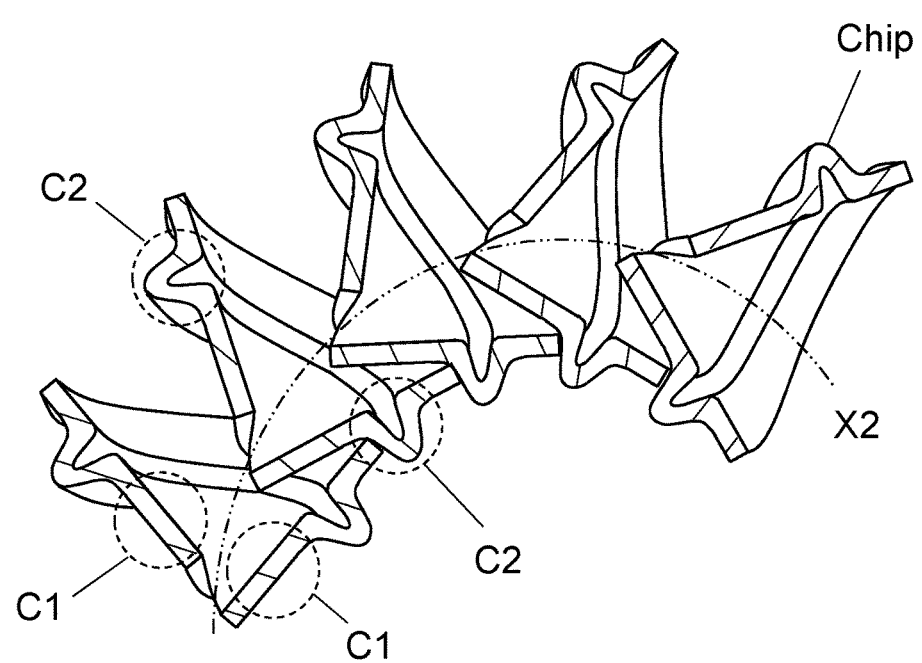
FIG. 5 is a schematic diagram of a chip obtained through a cutting process using the insert of the present embodiment.
Figure 6:
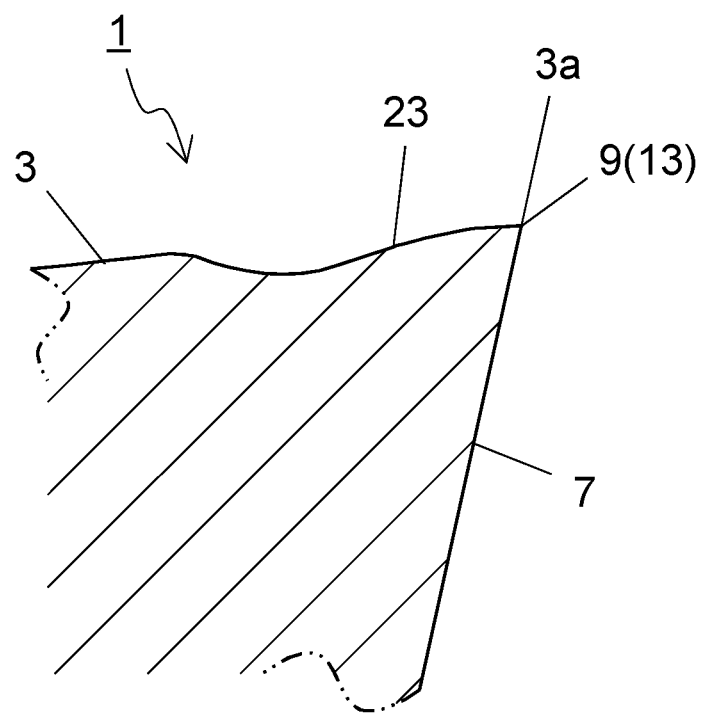
FIG. 6 is a sectional view of the insert taken along line A1 shown in FIG. 2.

In particular, when the chip generated at the cutting edge 9 advances toward the chip discharge flute of the holder, an advance direction of the chip turns as shown in FIG. 5. On this occasion, the convex shaped portions C2 become entangled on the inside of the axis X2 as shown in FIG. 5. Specifically, the convex shaped portion C2 is caught by the convex shaped portion C2 prior to one rotation in the spiral shaped chip. The chip is therefore not made into a short pitched spiral shape, thereby making it possible to increase the pitch of the chip.

The long pitch of the chip contributes to decreasing the number of turns per unit length in a direction along the axis X2 in the spiral shaped chip, thus achieving a small mass per unit length. This leads to a low weight of the chip when being discharged outside, thus minimizing the liability that the chip damages the processing apparatus or the like.

The chip generated when the cutting process is carried out using the insert 1 of the present embodiment has the long pitched spiral shape because the convex shaped portion C2 constitutes an obstruction, so that the chip has a small inclination angle with respect to the axis X2. Accordingly, the chips have a small width in a direction orthogonal to the axis X2. Consequently, a processing surface of the workpiece and the holder configured to allow attachment of the insert 1 are less likely to be damaged, and the chip is less likely to clog the chip discharge flute of the holder configured to permit passage of the chip.

When a radius of curvature of the third cutting edge 17 and a radius of curvature of the fourth cutting edge 19 are not constant, such as when the third cutting edge 17 and the fourth cutting edge 19 have a parabola shape or elliptic arc shape, it is necessary to compare a minimum value of the radius of curvature in the third cutting edge 17 that is inclined downward as going farther from the straight line-formed second cutting edge 15, and a minimum value of the radius of curvature in the fourth cutting edge 19 that is inclined upward as going farther from the third cutting edge 17.

In the insert 1 of the present embodiment, a length L3 of the third cutting edge 17 is larger than a length L4 of the fourth cutting edge 19 in a side view. When the third cutting edge 17 and the fourth cutting edge 19 have the above configuration, chips are less likely to be curled excessively.

In the embodiment shown in FIG. 3, because the third cutting edge 17 is located at the center of the side part, and the length L3 of the third cutting edge 17 is larger than the length L4 of the fourth cutting edge 19, the lower end of the cutting edge 9 is located farther away from the first corner part 3a than the center of the side part. In other words, the lower end of the cutting edge 9 is deviated to the right relative to the center of the side part as shown in FIG. 3.

Also in the embodiment shown in FIG. 3, the length L3 of the third cutting edge 17 is larger than the length L2 of the second cutting edge 15 in a side view. When the length of the third cutting edge 17 having the convex curvilinear shape is relatively larger than that of the second cutting edge 15, it becomes easy to curve the chips. This makes it easier to bring the chips into the stable spiral shape, so that the chip behavior becomes stable.

The cutting edge 9 in the present embodiment further has the fifth cutting edge 21 located between the third cutting edge 17 and the fourth cutting edge 19. The fifth cutting edge 21 in the present embodiment has a concave curvilinear shape in a side view. Therefore, a part of the cutting edge 9, which is located from the third cutting edge 17 via the fifth cutting edge 21 to the fourth cutting edge 19, has a shape that is recessed downward. In the present embodiment, the fifth cutting edge 21 located between the third cutting edge 17 and the fourth cutting edge 19 is located at a lower end of the cutting edge 9.

When the fifth cutting edge 21 having the recessed curvilinear shape is located between the third cutting edge 17 and the fourth cutting edge 19, the third cutting edge 17 and the fourth cutting edge 19 are smoothly connectable to each other, thereby enhancing durability of the cutting edge 9.

When a radius of curvature R5 of the fifth cutting edge 21 is smaller than the radius of curvature R3 of the third cutting edge 17, the fifth cutting edge 21, which is a portion of the cutting edge 9 having a concave shape being recessed downward, has a sharper recessed shape in a side view. When provided with the above configuration, the chip generated by the cutting edge 9 has a largely curved shape that is more hardly deformable.

When a radius of curvature R5 of the fifth cutting edge 21 is larger than the radius of curvature R4 of the fourth cutting edge 19, load concentration on the fifth cutting edge 21 is less likely to occur.

When the radius of curvature R5 of the fifth cutting edge 21 is not constant, such as when the fifth cutting edge 21 has a parabola shape or elliptic arc shape, it is necessary to compare a minimum value of the radius of curvature R5 in the fifth cutting edge 21 with the minimum value of the radius of curvature R3 of the third cutting edge 17 or the minimum value of the radius of curvature R4 of the fourth cutting edge 19, as in the case with the third cutting edge 17 and the fourth cutting edge 19.

A region in which the upper surface 3 and the side surface 7 intersect each other and the cutting edge 9 is formed may be subjected to a so-called honing process. When subjected to the honing process, the region in which the upper surface 3 and the side surface 7 intersect each other is no longer a precise line shape obtainable by the intersection of these two surfaces. Strength of the cutting edge 9 is improvable by applying the honing process.

Although the cutting edge 9 in the present embodiment includes the first cutting edge 13, the second cutting edge 15, the third cutting edge 17, the fourth cutting edge 19, and the fifth cutting edge 21 as described above, the cutting edge 9 is not limited to one which is made up of only these parts. Specifically, these parts may have therebetween a connection part (not shown) through which these parts are smoothly connected to each other. For example, the fourth cutting edge 19 and the second corner part 3b may have therebetween a straight line-shaped cutting edge part through which these are connected to each other.

As shown in FIGS. 1 and 2, the upper surface 3 in the present embodiment includes an inclined surface that is inclined downward as going farther from the cutting edge 9. In the present embodiment, the inclined surface has such a role that is just like scooping up the chip generated at the cutting edge 9, namely, functions as a so-called rake surface. For a smooth flow of the chip, the inclined surface is inclined downward as going farther from the cutting edge 9. In other words, the inclined surface in the insert 1 of the present embodiment is inclined so as to come closer to the lower surface 5 as coming closer to the through hole 11.

The inclined surface in the present embodiment has a first inclined surface 23, a second inclined surface 25, a third inclined surface 27, and a fourth inclined surface 29. The first inclined surface 23 is a region of the inclined surface which is located along the first cutting edge 13. The second inclined surface 25 is a region of the inclined surface which is located along the second cutting edge 15. The third inclined surface 27 is a region of the inclined surface which is located along the third cutting edge 17. The fourth inclined surface 29 is a region of the inclined surface which is located along the fourth cutting edge 19.

Figure 7:
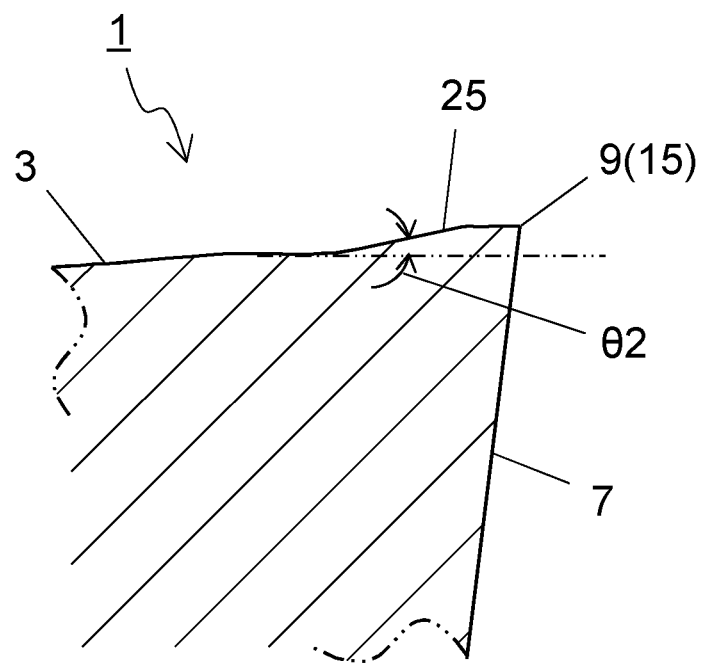
FIG. 7 is a sectional view of the insert taken along line A2 shown in FIG. 2.
Figure 8:
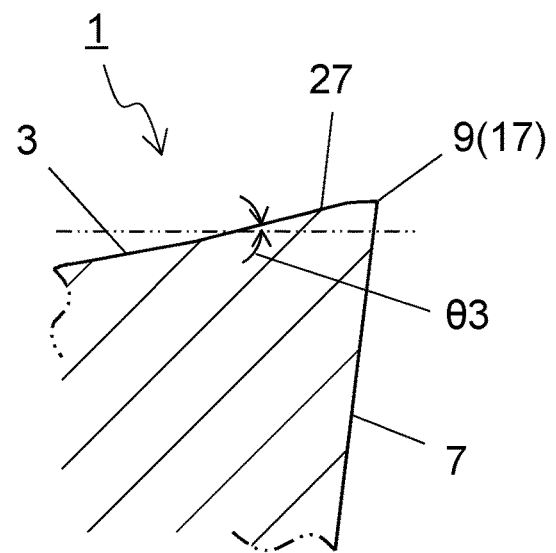
FIG. 8 is a sectional view of the insert taken along line A3 shown in FIG. 2.
Figure 9:
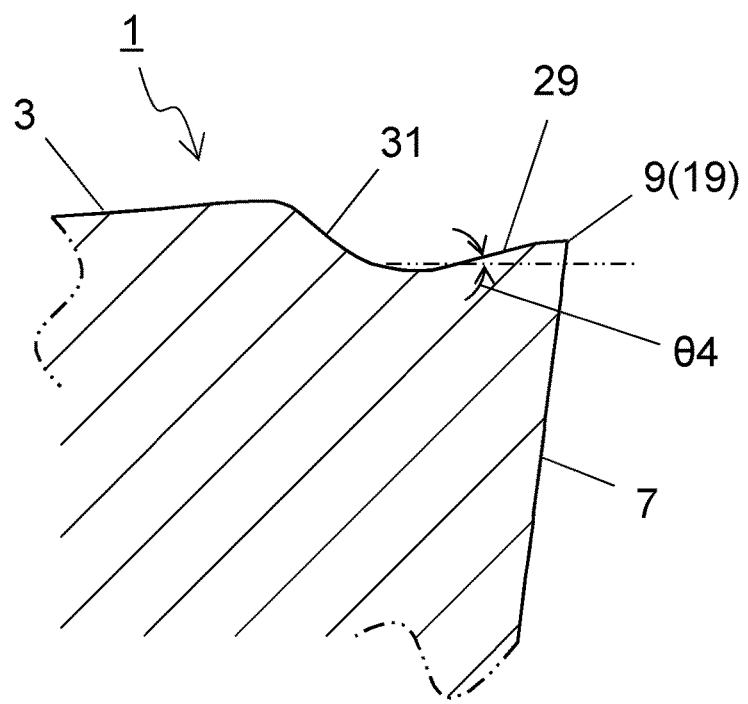
FIG. 9 is a sectional view of the insert taken along the line A2 shown in FIG. 2.

When each of an inclination angle θ3 of the third inclined surface 27 shown in FIG. 8, and an inclination angle θ4 of the fourth inclined surface 29 shown in FIG. 9 is larger than an inclination angle θ2 of the second inclined surface 25 shown in FIG. 7, it is possible to reduce load exerted on the second cutting edge 15 that is configured to bite into the workpiece. Moreover, because the inclination angle θ2 of the second inclined surface 25 located along the second cutting edge 15 is relatively small, the strength of the second cutting edge 15 is enhanced, thus leading to enhanced durability of the insert 1.

Additionally, the upper surface 3 in the present embodiment further includes, besides the above inclined surface, an ascending surface 31 located further inside the upper surface 3 than the inclined surface. The ascending surface 31 has a role in curling chips passing through the inclined surface 21, and then bringing the chips into the spiral shape. Therefore, the ascending surface 31 is located more inward than the inclined surface 21 and inclined upward as going farther from the inclined surface.

As shown in FIG. 2, the ascending surface 31 in the present embodiment is not located inside the entirety of the inclined surface, but is located only inside a region extending from the third inclined surface 17 to the fourth inclined surface 19.

When the ascending surface 31 is located at the above region, the chips can be curled stably while reducing chip clogging that can occur in the second cutting edge 15.

When an inclination angle at a region of the ascending surface 31 which is located inside the fourth cutting edge 19 is larger than an inclination angle at a region of the ascending surface 31 which is located inside the third cutting edge 17, it is possible to stably bring the chips into the spiral shape. When the ascending surface 31 is so configured, it becomes easy to curve the chips generated at the fourth cutting edge 19 toward the center of the spiral-shaped chips. Consequently, the edge on the outer peripheral side of the chip is less apt to come into contact with the inner peripheral surface of the drilled hole and the surface of the chip discharge flute of the holder.

Moreover, in order to more stably bring the chips into the spiral shape with the ascending surface 31, a height of an upper end of a region of the ascending surface 31 which is located inside the fourth cutting edge 19 is preferably located at a position higher than the fourth cutting edge 19.

<Drill>

A drill 101 of an embodiment is described below with reference to the drawings.

Figure 10:
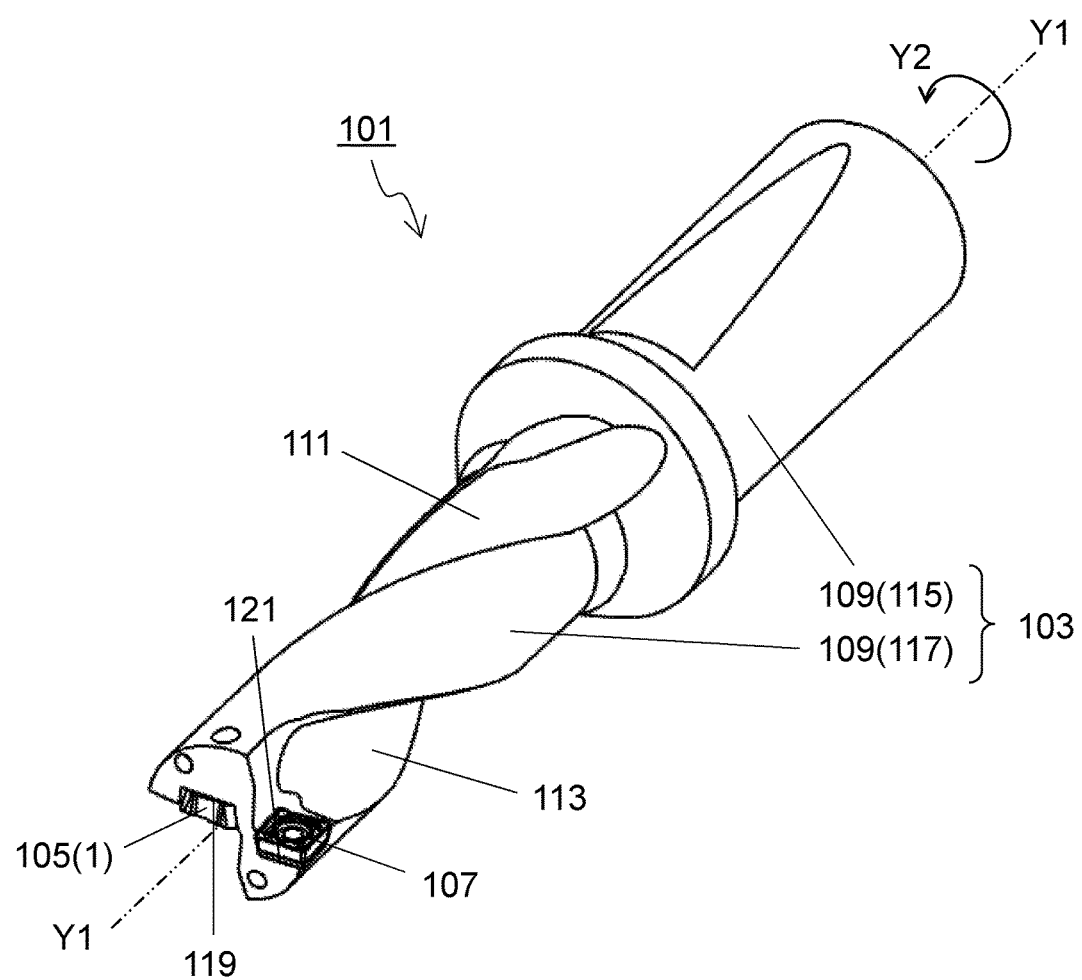
FIG. 10 is a perspective view that shows a drill according to an embodiment.
Figure 11:
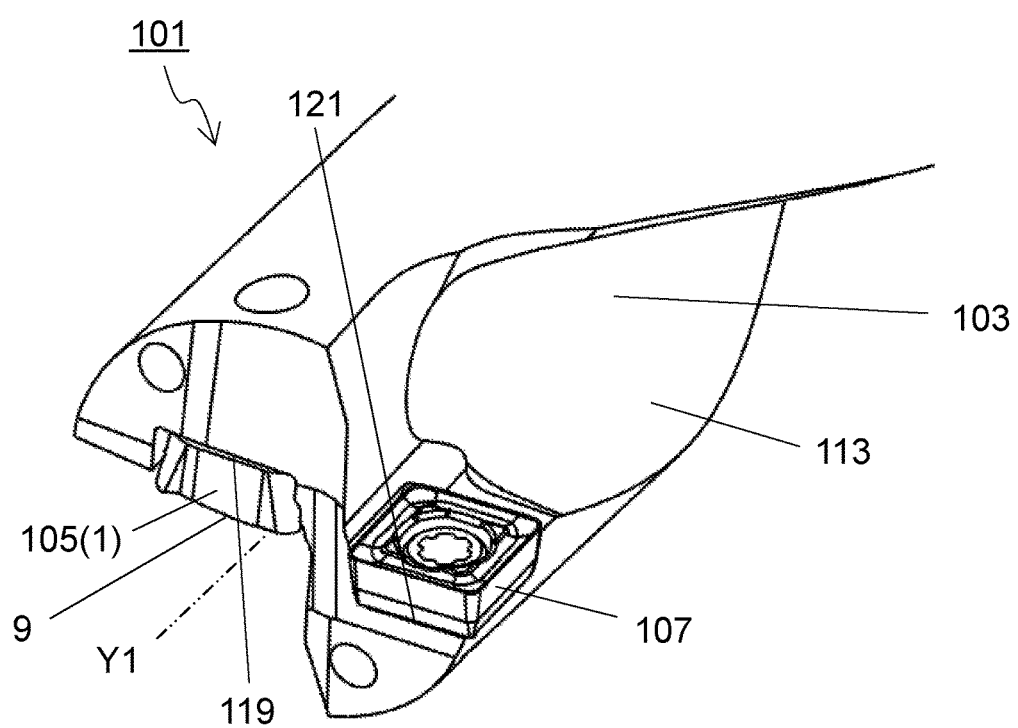
FIG. 11 an enlarged view of a front end part of the drill shown in FIG. 10.
Figure 12:
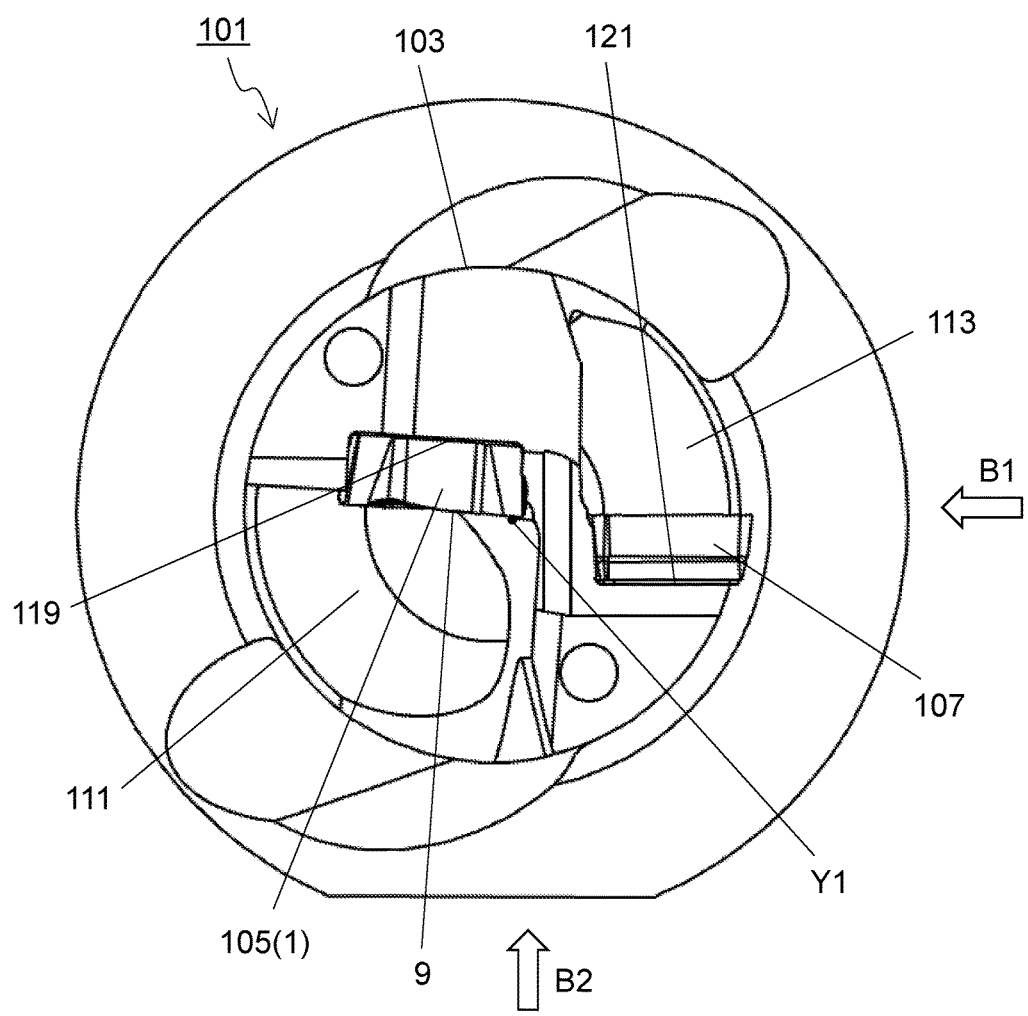
FIG. 12 is a front view of a front end of the drill shown in FIG. 10.
Figure 13:
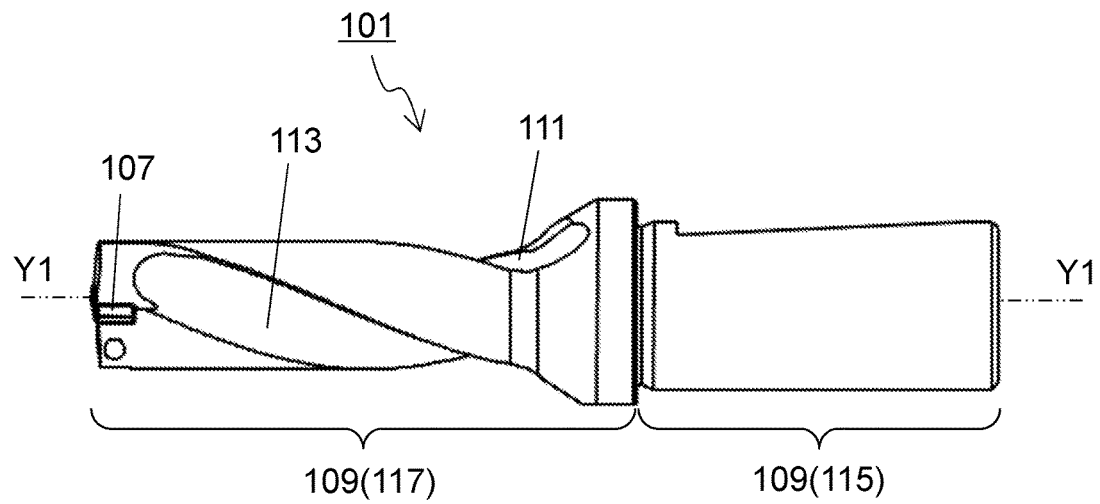
FIG. 13 is a side view of the drill shown in FIG. 12, viewed from B1 direction.
Figure 14:
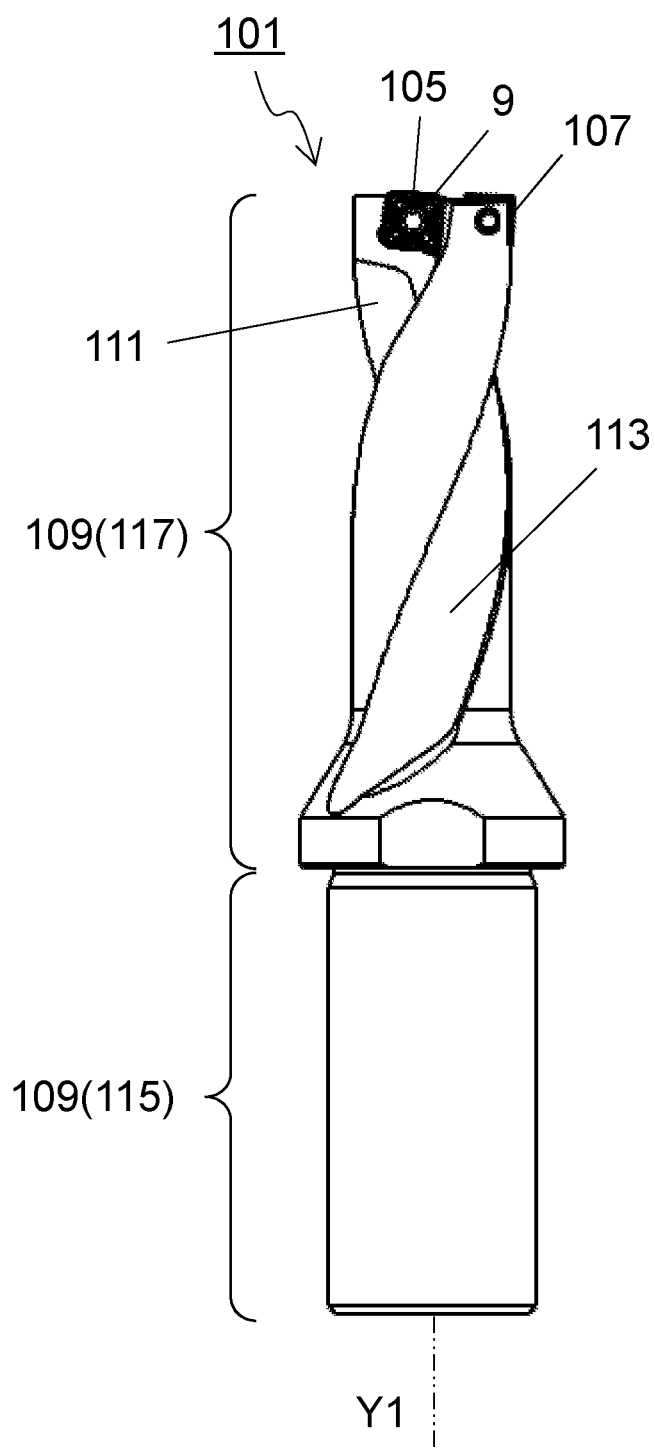
FIG. 14 is a side view of the drill shown in FIG. 12, viewed from B2 direction.
Figure 15:
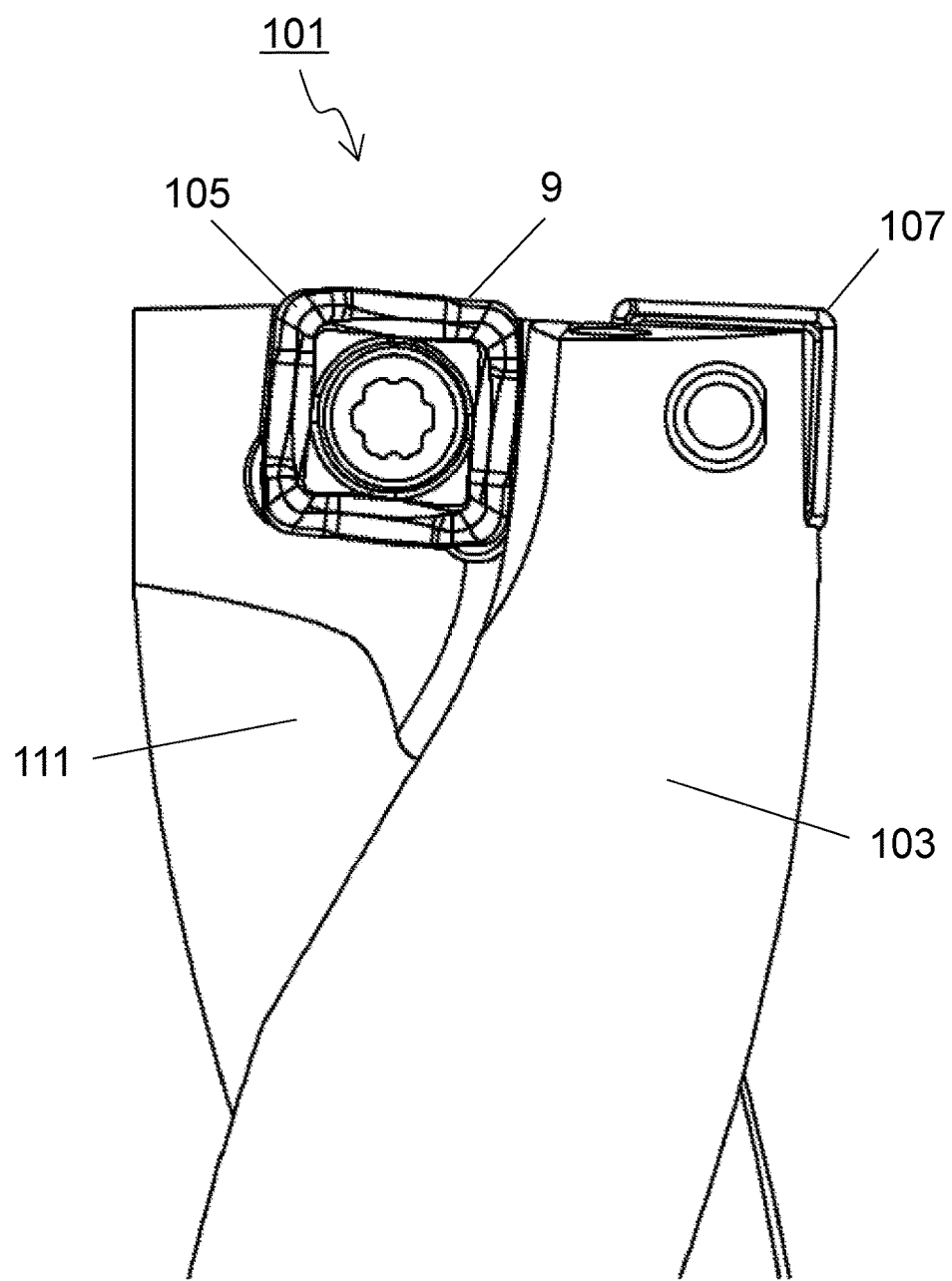
FIG. 15 an enlarged view of a front end part of the drill shown in FIG. 14.

As shown in FIG. 10, the drill 101 of the present embodiment includes a holder 103, an insert 105 for an inner cutting edge, and an insert 107 for an outer cutting edge. An embodiment using the insert 1 of the present embodiment as the insert 105 for the inner cutting edge is described below.

The holder 103 includes a body part 109, a first chip discharge flute 111 (hereinafter also referred to simply as "a first flute 111"), and a second chip discharge flute 113 (hereinafter also referred to simply as "a second flute 113"). The body part 109 has a bar shape being rotatable around a rotation axis Y1. The body part 109 rotates around the rotation axis Y1 during a cutting process.

Although not particularly being illustrated, a rotary locus of the cutting edge 9 in the insert 105 for the inner cutting edge and a rotary locus of the cutting edge in the insert 107 for the outer cutting edge are partially overlapped with each other in a front end view, and are overlapped with the entirety of the body part 109. A drilling process is carried out by the cutting edges of the insert 105 for the inner cutting edge and the insert 107 for the outer cutting edge which are formed as described above.

The body part 109 in the present embodiment includes a holding section 115 which is held by, for example, a rotating spindle of a machine tool (not shown), and is called "shank", and a cutting section 117 which is located closer to a front end side than the holding section 115, and is called "body." The holding section 115 is a section to be designed according to the shape of the spindle and the like in the machine tool. The cutting section 117 is a section whose front end is configured to accept attachment of the inserts 105 and 107. The cutting section 117 plays a major role in the cutting process of a workpiece. Arrow Y2 indicates a rotation direction of the body part 109.

A first pocket 119 and a second pocket 121 are disposed on the front end side of the cutting section 117 in the body part 109. The first pocket 119 is a recessed portion disposed close to the center at the front end of the cutting section 117, and is the portion configured to accept attachment of the insert 105 for the inner cutting edge. The second pocket 121 is a recessed portion disposed close to an outer peripheral side of the front end of the cutting section 117, and is the portion configured to accept attachment of the insert 107 for the outer cutting edge. The first pocket 119 and the second pocket 121 are disposed away from each other so that the insert 105 for the inner cutting edge and the insert 107 for the outer cutting edge do not come into contact with each other.

The insert 105 is located inside the first pocket 119, and the insert 107 is located inside the second pocket 121. Here, the insert 105 for the inner cutting edge is attached so that the second cutting edge in the insert 105 for the inner cutting edge intersects the rotation axis Y1. In the present embodiment, an insert that is different from the insert 1 of the foregoing embodiment is used as the insert 107 for the outer cutting edge. Alternatively, the insert 1 of the foregoing embodiment may also be used as the insert 107 for the outer cutting edge.

The first flute 111 extends from the insert 105 for the inner cutting edge toward a rear end of the body part 109, and extends spirally around the rotation axis Y1.

The second flute 113 extends from the insert 107 for the outer cutting edge toward the rear end of the body part 109, and extends spirally around the rotation axis Y1. In the present embodiment, the first flute 111 and the second flute 113 are disposed on the cutting section 117 in the body part 109, but are not disposed on the holding section 115.

In the drill 101 of the present embodiment, an outer diameter of the cutting section 117 is settable to, for example, 6-42.5 mm. The drill 101 of the present embodiment is settable to, for example, L=2D to 12D, in which L is a length of an axis (length of the cutting section 117), and D is a diameter (outer diameter of the cutting section 117).

As a material of the body part 109, for example, steel, cast iron, or aluminum alloy is usable. Steel is preferable in view of high rigidity.

The first flute 111 is intended mainly to discharge chips generated by the cutting edge of the insert 105 for the inner cutting edge. During the cutting process, the chips generated by the insert 105 for the inner cutting edge are discharged through the first flute 111 to the rear end side of the body part 109. The second flute 113 is intended mainly to discharge chips generated by the cutting edge of the insert 107 for the outer cutting edge. During the cutting process, the chips generated by the insert 107 for the outer cutting edge are discharged through the second flute 113 to the rear end side of the body part 109.

A depth of each of the first flute 111 and the second flute 113 is settable to approximately to 10-40% of an outer diameter of the cutting section 117. As used herein, the term "the depth of each of the first flute 111 and the second flute 113" denotes a value obtainable by subtracting a distance between a bottom of each of the first flute 111 and the second flute 113 and the rotation axis Y1, from a radius of the cutting section 117 in a cross section orthogonal to the rotation axis Y1. Therefore, a diameter of a web thickness indicated by a diameter of an inscribed circle in the cross section orthogonal to the rotation axis Y1 in the cutting section 117 is settable to approximately 20-80% of the outer diameter of the cutting section 117. Specifically, for example, when the outer diameter D of the cutting section 117 is 20 mm, the depth of each of the first flute 111 and the second flute 113 is settable to approximately 2-8 mm.

<Method of Manufacturing Machined Product>

A method of manufacturing a machined product according to an embodiment of the present invention is described in detail below by exemplifying the case of using the drill 101 according to the foregoing embodiment. A description is given below with reference to FIGS. 16 to 18. A rear end side region of the holding section 115 in the drill 101 is omitted from FIGS. 16 to 18.

The method of manufacturing the machined product according to the present embodiment includes the following steps (1) to (4).

Figure 16:
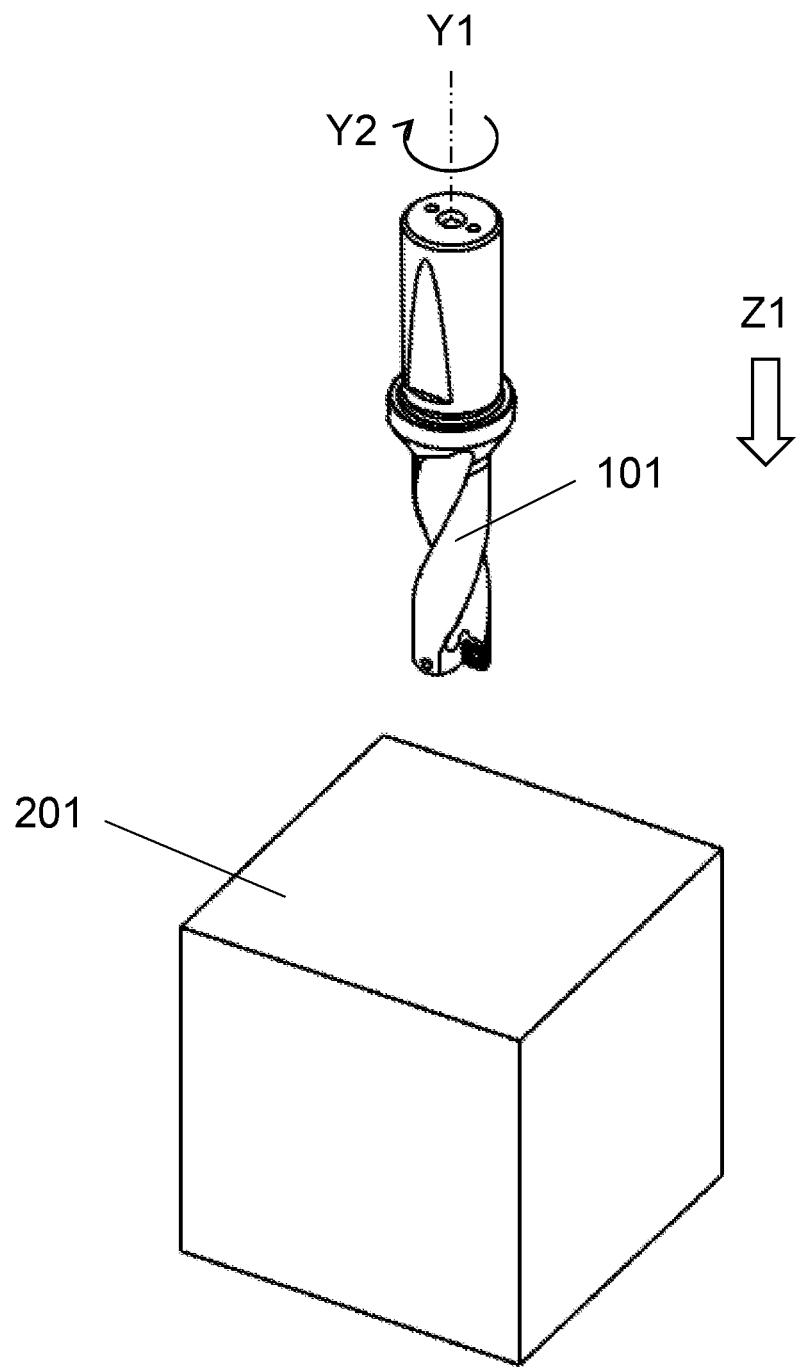
FIG. 16 is a schematic diagram that shows a step in a method of manufacturing a machined product according to an embodiment.

(1) The step of putting the drill 101 above a prepared workpiece 201 (refer to FIG. 16).

Figure 17:
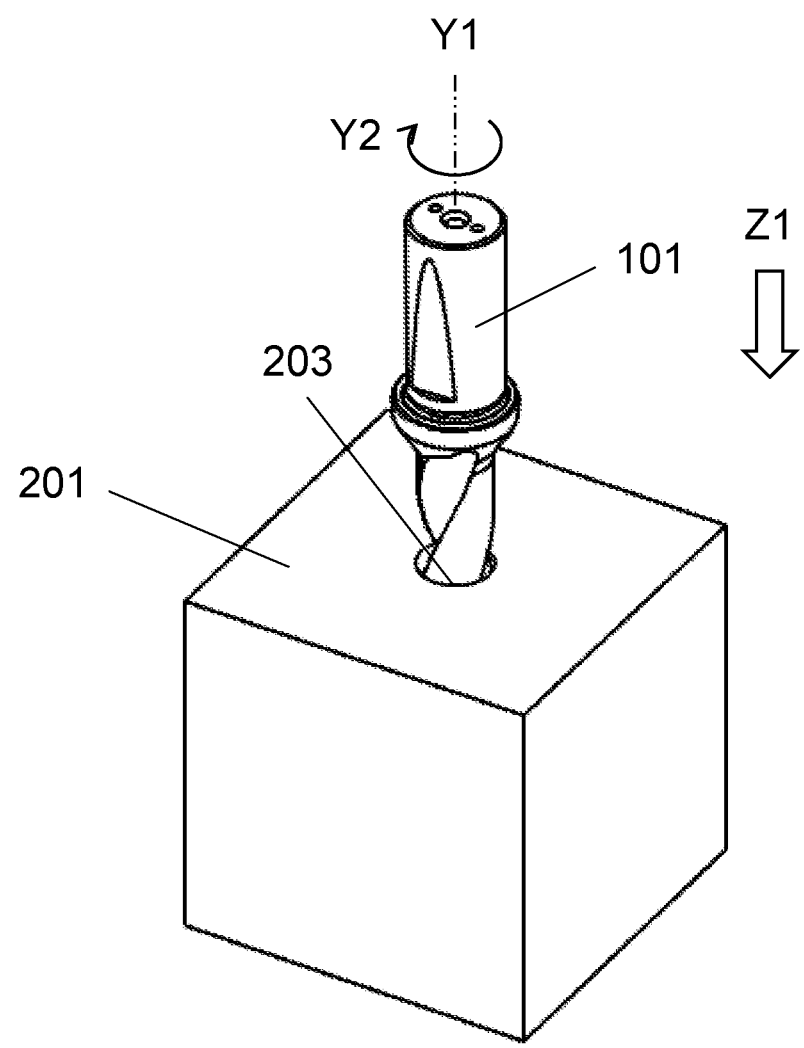
FIG. 17 is a schematic diagram that shows a step in the method of manufacturing a machined product according to the embodiment.

(2) The step of rotating the drill 101 around the rotation axis Y1 in a direction indicated by arrow Y2, and bringing the drill 101 closer to the workpiece 201 in Z1 direction (refer to FIGS. 16 and 17).

The above step is performable by, for example, fixing the workpiece 201 onto a table of the machine tool having the drill 101 attached thereto, and then bringing the drill 101 being rotated closer to the workpiece. In the above step, the workpiece 201 and the drill 101 need to be relatively close to each other. Alternatively, the workpiece 201 may be brought closer to the drill 101.

(3) The step of forming a drilled hole 203 in the workpiece 201 by bringing the drill 101 further closer to the workpiece 201 so as to cause the cutting edge 9 of the drill 101 being rotated to come into contact with a desired position on the surface of the workpiece 201 (refer to FIG. 17).

In the above step, a setting is preferably made so that a partial region on the rear end side of the cutting section of the drill 101 does not come into contact with the workpiece 201, from the viewpoint of obtaining a good finished surface. In other words, good chip discharge performance is producible through the partial region by making the partial region serve as a chip discharge region.

Figure 18:
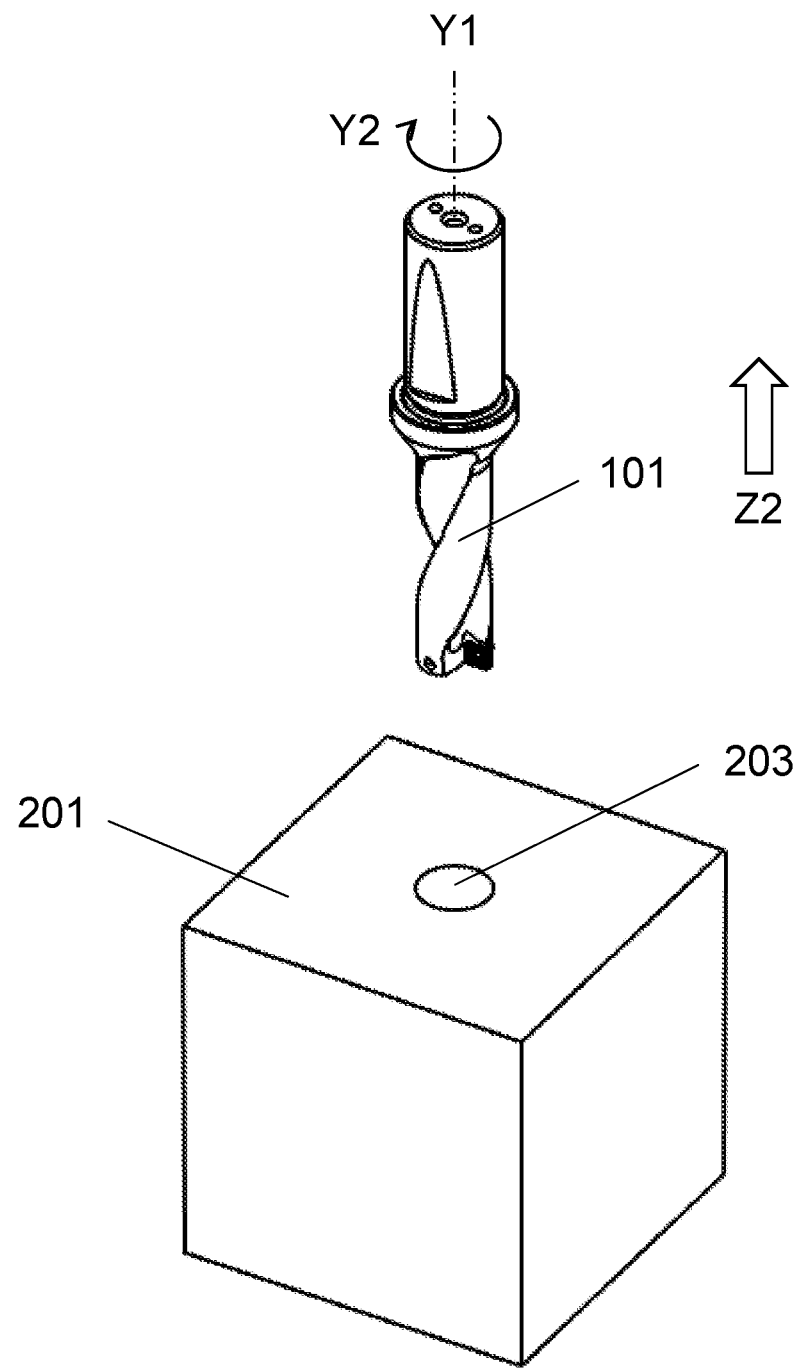
FIG. 18 is a schematic diagram that shows a step in the method of manufacturing a machined product according to the embodiment.

(4) The step of separating the drill 101 from the workpiece 201 in Z2 direction (refer to FIG. 18).

Also in the above step, the workpiece 201 and the drill 101 need to be relatively separated from each other as in the case with the above step (2). For example, the workpiece 201 may be separated from the drill 101.

The machined product having the drilled hole 203 is obtainable through the steps as described above.

When the foregoing cutting process of the workpiece 201 is performed a plurality of times, for example, when forming a plurality of the drilled holes 203 in a single workpiece 201, it is necessary to repeat the step of bringing the cutting edge 9 of the drill 101 into contact with different portions of the workpiece 201, while keeping the drill 101 rotated.

Although the embodiments of the insert and the drill have been illustrated and described above, the inert and the drill of the present invention are not limited thereto. It is, of course, possible to make any optional ones insofar as they do not depart from the gist of the present invention.

DESCRIPTION OF THE REFERENCE NUMERAL 1 insert
3 upper surface
5 lower surface
7 side surface
9 cutting edge
11 through hole
13 first cutting edge
15 second cutting edge
17 third cutting edge
19 fourth cutting edge
21 fifth cutting edge
23 first inclined surface 25 second inclined surface
27 third inclined surface
29 fourth inclined surface
31 ascending surface
101 drill
103 holder
105 insert for inner cutting edge
107 insert for outer cutting edge
109 body part
111 first chip discharge flute (first flute)
113 second chip discharge flute (second flute)
115 holding section
117 cutting section
119 first pocket
121 second pocket
201 workpiece
203 drilled hole

What is claimed is:

1. An insert, comprising:
an upper surface comprising:
    a first corner part;
    a second corner part; and
    a first side connected to the first corner part and the second corner part;
a lower surface;
a side surface located between the upper surface and the lower surface; and
a cutting edge located at the first corner and the first side, and comprising:
    a first cutting edge located at the first corner part;
    a second cutting edge located between the first cutting edge and the second corner part;
    a third cutting edge located between the second cutting edge and the second corner part, having a convex curvilinear shape with a first radius of curvature, and extending downward as going farther from the second cutting edge toward the second corner part;
    a fourth cutting edge located between the third cutting edge and the second corner part, having a convex curvilinear shape with a second radius of curvature, and extending upward as going farther from the third cutting edge in a side view toward the second corner part; and
    a fifth cutting edge located between the third cutting edge and the fourth cutting edge, and having a concave curvilinear shape in a side view;
wherein
    the second radius of curvature is smaller than the first radius of curvature,
    the fifth cutting edge has a third radius of curvature that is smaller than the first radius of curvature, and
    the third cutting edge passes through a center of the first side between the first corner part and the second corner part that is subsequent to the first corner part.

2. The insert according to claim 1, wherein
the third cutting edge has a first length in a side view,
the fourth cutting edge has a second length in a side view, and
the first length is larger than the second length.

3. The insert according to claim 2, wherein
the second cutting edge has a third length in a side view, and
the first length is larger than the third length.

4. The insert according to claim 1, wherein
the third radius of curvature is larger than the second radius of curvature.

5. The insert according to claim 1, wherein
the upper surface further comprises an inclined surface being inclined downward as going farther from the cutting edge towards a center of the upper surface,
the inclined surface comprises:
    a first inclined surface located along the first cutting edge;
    a second inclined surface located along the second cutting edge, and having a first inclination angle;
    a third inclined surface located along the third cutting edge, and having a second inclination angle;
    a fourth inclined surface located along the fourth cutting edge, and having a third inclination angle; and
    each of the second inclination angle and the third inclination angle is larger than the first inclination angle.

6. An indexable insert drill, comprising:
a holder comprising a pocket located on a front end side thereof; and
an insert according to claim 1, the insert being located in the pocket.

7. A method of manufacturing a machined product, comprising:
rotating a drill according to claim 6;
bringing the drill being rotated into contact with a workpiece; and
separating the drill from the workpiece.

8. An insert, comprising:
an upper surface comprising:
    a first corner part;
    a second corner part; and
    a first side connected to the first corner part and the second corner part;
a lower surface;
a side surface located between the upper surface and the lower surface; and
a cutting edge located at the first corner and the first side, and comprising:
    a first cutting edge located at the first corner part;
    a second cutting edge located between the first cutting edge and the second corner part;
    a third cutting edge located between the second cutting edge and the second corner part, having a convex curvilinear shape with a first radius of curvature, and extending downward as going farther from the second cutting edge toward the second corner part;
    a fourth cutting edge located between the third cutting edge and the second corner part, having a convex curvilinear shape with a second radius of curvature, and extending upward as going farther from the third cutting edge in a side view toward the second corner part; and
    a fifth cutting edge located between the third cutting edge and the fourth cutting edge, and having a concave curvilinear shape in a side view;
wherein
    the second radius of curvature is smaller than the first radius of curvature,
    the fifth cutting edge has a third radius of curvature that is larger than the second radius of curvature, and
    the third cutting edge passes through a center of the first side between the first corner part and the second corner part that is subsequent to the first corner part.

9. The insert according to claim 8, wherein
the third cutting edge has a first length in a side view,
the fourth cutting edge has a second length in a side view, and
the first length is larger than the second length.

10. The insert according to claim 9, wherein
the second cutting edge has a third length in a side view, and
the first length is larger than the third length.

11. The insert according to claim 8, wherein
the upper surface further comprises an inclined surface being inclined downward as going farther from the cutting edge towards a center of the upper surface,
the inclined surface comprises:
- a first inclined surface located along the first cutting edge;
- a second inclined surface located along the second cutting edge, and having a first inclination angle;
- a third inclined surface located along the third cutting edge, and having a second inclination angle;
- a fourth inclined surface located along the fourth cutting edge, and having a third inclination angle; and
- each of the second inclination angle and the third inclination angle is larger than the first inclination angle.

12. An insert, comprising:
an upper surface comprising:
- a first corner part;
- a second corner part; and
- a first side connected to the first corner part and the second corner part;
a lower surface;
a side surface located between the upper surface and the lower surface; and
a cutting edge located at the first corner and the first side, and comprising:
- a first cutting edge located at the first corner part;
- a second cutting edge located between the first cutting edge and the second corner part;
- a third cutting edge located between the second cutting edge and the second corner part, having a convex curvilinear shape with a first radius of curvature, and extending downward as going farther from the second cutting edge toward the second corner part;
- a fourth cutting edge located between the third cutting edge and the second corner part, having a convex curvilinear shape with a second radius of curvature, and extending upward as going farther from the third cutting edge in a side view toward the second corner part; and
- a fifth cutting edge located between the third cutting edge and the fourth cutting edge, and having a concave curvilinear shape in a side view;

wherein
the second radius of curvature is smaller than the first radius of curvature,
the upper surface further comprises an inclined surface being inclined downward as going farther from the cutting edge towards a center of the upper surface,
the inclined surface comprises:
- a first inclined surface located along the first cutting edge;
- a second inclined surface located along the second cutting edge, and having a first inclination angle;
- a third inclined surface located along the third cutting edge, and having a second inclination angle;
- a fourth inclined surface located along the fourth cutting edge, and having a third inclination angle; and
- each of the second inclination angle and the third inclination angle is larger than the first inclination angle; and
the third cutting edge passes through a center of the first side between the first corner part and the second corner part that is subsequent to the first corner part.

13. The insert according to claim 12, wherein
the upper surface comprises an ascending surface that is:
- located only inside a second region extending from the third inclined surface to the fourth inclined surface; and
- inclined upward as going farther from the third inclined surface and the fourth inclined surface toward the center of the upper surface.

14. The insert according to claim 12, wherein
the third cutting edge has a first length in a side view,
the fourth cutting edge has a second length in a side view, and
the first length is larger than the second length.

15. The insert according to claim 14, wherein
the second cutting edge has a third length in a side view, and
the first length is larger than the third length.

16. The insert according to claim 12, wherein
the third inclination angle is larger than the second inclination angle.

17. The insert according to claim 13, wherein
an upper portion of the ascending surface located inside the second region and extending from the fourth inclined surface is located at a position higher than the fourth cutting edge.

* * * * *